UNITED STATES PATENT OFFICE.

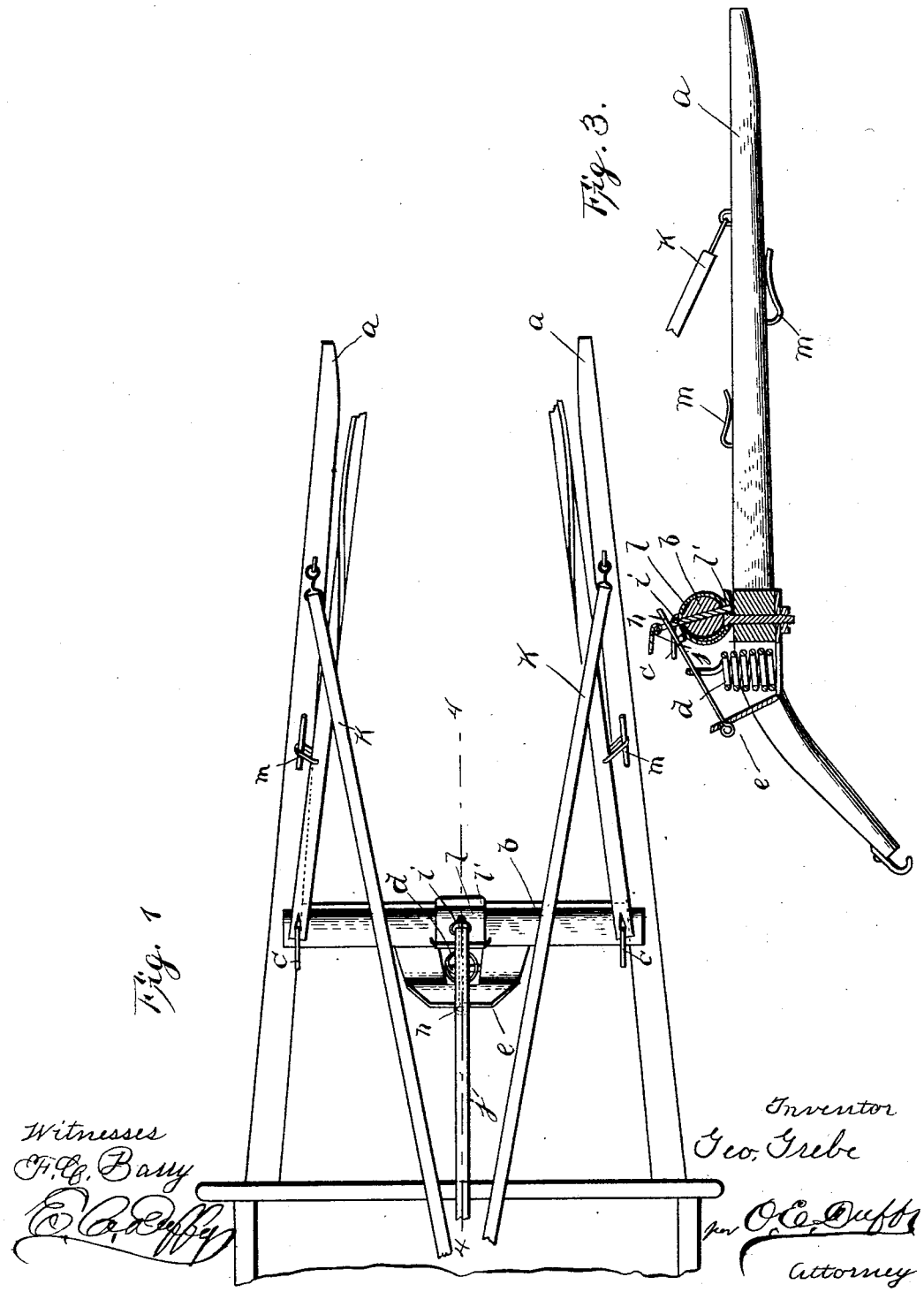

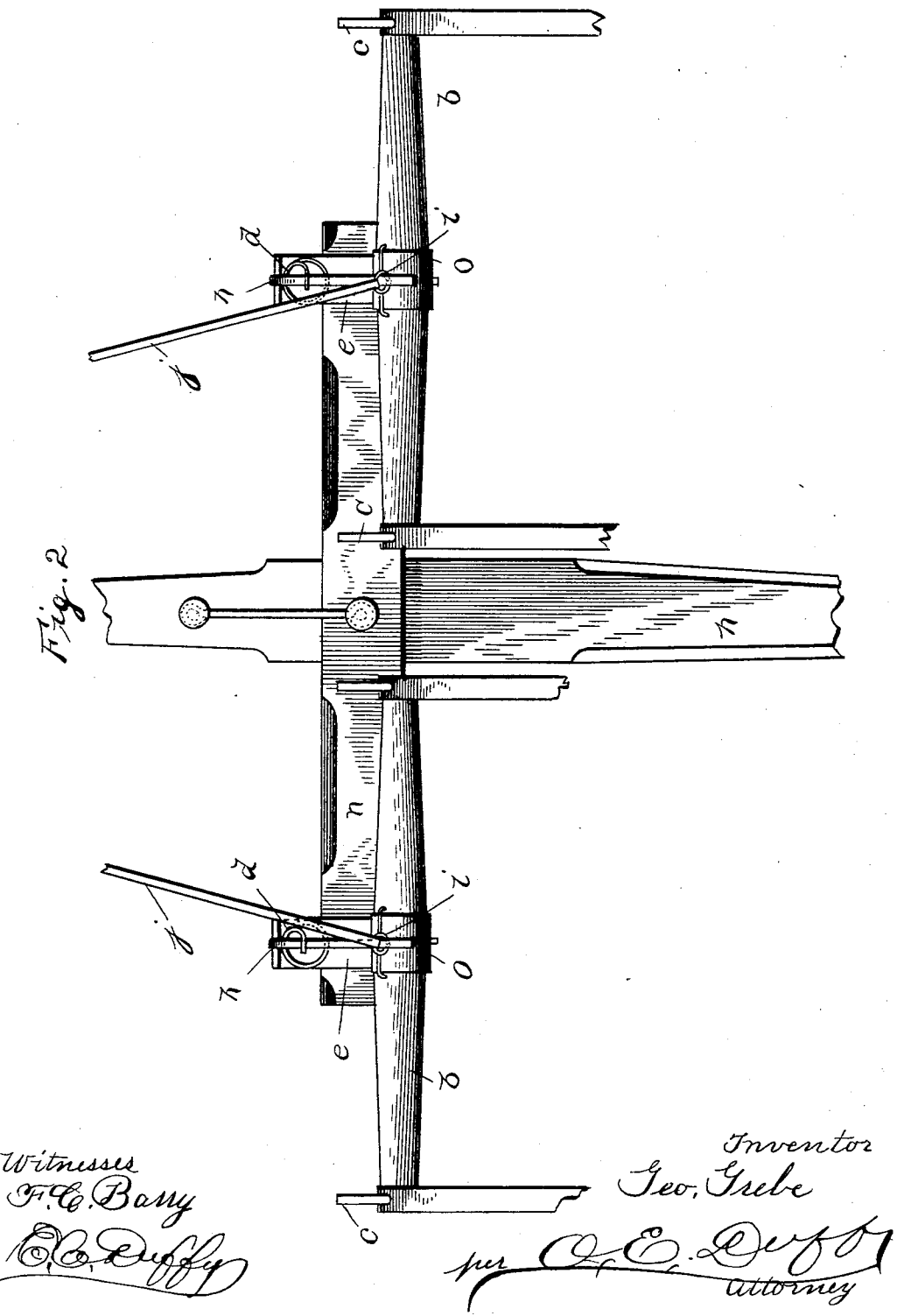

GEORGE GREBE, OF SWANTON, NEBRASKA.

HORSE-DETACHER.

SPECIFICATION forming part of Letters Patent No. 591,797, dated October 12, 1897.

Application filed April 16, 1897. Serial No. 632,485. (No model.)

*To all whom it may concern:*

Be it known that I, GEORGE GREBE, of Swanton, in the county of Saline and State of Nebraska, have invented certain new and useful Improvements in Horse-Detachers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain new and useful improvements in horse-detachers, and has for its object simplicity, durability, and cheapness in construction, being composed of a minimum number of parts.

A further object of the invention is to provide means for easily and quickly releasing a wild, mad, and fractious horse (or horses) from a vehicle.

A further object of the invention is to provide a horse-detacher which can be applied to single or double teams and do equally effective work.

A further object of the invention is to provide means for operating the detacher from the driver's seat and also means for guiding the vehicle after the horse has been detached.

The invention consists in certain novel features of construction and in combinations of parts, more fully described hereinafter, and particularly pointed out in the claims.

In the drawings, Figure 1 is a top plan view of the invention as applied to single team or shafts. Fig. 2 is a similar view applied to a pole or double team. Fig. 3 is a cross-section on the line 4 4, Fig. 1.

Referring by letters to the accompanying drawings, $a$ are the shafts, and $b$ is the rotatable singletree, having the tug-fastenings $c$, and the singletree is removably held in its normal position by the tension of a spring $d$, which is carried by the angular plate $e$ and carries near its top a loosely-swinging tongue or trigger $h$, which is loosely attached to and controlled by the spring $d$ and movably secured to the pin $i$, which holds the singletree in place and is adapted to be withdrawn by the strap or line $j$ to allow the singletree to rock when the horse is to be released. At or near the front ends of the shafts are attached the ends of the strap $k$, for the purpose of holding the shafts up and guiding the vehicle after the horse has been released.

$l$ is a band made of spring material secured to the top of the cross-bar $t$ by the bolt $u$, having the forward free end $l'$. This band encircles the singletree $b$ about its middle, and it is removably held in position and against rotation by the pin $i$, which passes through the band $l$ and the singletree $b$ into the free end $l'$. The pin $i$ is attached to the end of the releasing-strap $j$ and is provided with an opening into which the free end of the trigger $h$ rests and holds said pin in place by the tension of the coil-spring $d$, which is carried by the angular plate $e$ and pulls down on the trigger $h$. The free end $l'$ of the band $l$ forms a spring, the tension of which returns the singletree to its normal position after it has been rocked by the strain on the tugs when the horse leaves the shafts.

$m$ are breeching or holdback loops so arranged either on the top or bottom of the shafts and constructed in such a manner as to allow the holdback-straps to pass free of the shafts when the horse is freed from the vehicle. When the pin $i$ is withdrawn by the releasing-strap $j$, the singletree rocks, by reason of the strain on the tug-fastenings $c$, far enough to allow the tugs to be released from the fastenings. The tension of the spring $l'$ then takes effect and the singletree is returned to its normal position, the pin $i$ replaced through the band and singletree, and the trigger $h$ set in the eye of said pin, and the device is again ready for the hitching of the horse.

When a pole is used, the angle-plates are secured at or near the ends of the doubletree $n$ and carry the spring $d$ and the tongue $h$, which operate in the same manner as has been described, and the releasing-strap $j$ is attached at each end to the securing-pins $i$, which are removably held in the middle of each of the singletrees $b$, and passing through the bands $o$, in which the singletrees rock.

The simplicity and efficiency of this device are obvious. It is only necessary to give the strap or line $j$ a jerk, withdrawing the pin $i$ against the tension of the spring $d$ by means of the trigger $h$, allowing the strain on the tugs to rock the singletree, overcome the band-spring l', and allow the tugs and holdbacks to pass free of the vehicle.

It is evident that various slight changes might be made in the forms, construction, and arrangements of the parts described without departing from the spirit and scope of my invention. Hence I do not wish to limit myself to the exact construction herein set forth, but consider myself entitled to all such changes.

Having thus fully described my invention, what I claim, and desire to secure by Letters Patent of the United States, is—

1. A horse-detacher comprising the shafts connected by a cross-bar, a band carried by said cross-bar, a singletree held within said band, a pin passing through said band and singletree, a spring-controlled trigger adapted to hold said pin in place and a rod or strap connected to said pin and adapted to withdraw it when desired, substantially as described.

2. A horse-detacher comprising the shafts connected by a cross-bar, a band carried by said cross-bar, a singletree held within said band, a pin passing through said band and singletree, a spring-controlled trigger adapted to hold said pin in position, a rod or strap connected to said pin and adapted to withdraw it when desired and straps to hold the shafts in an elevated position and guide the vehicle after the horse has been detached.

3. A horse-detacher consisting of the shafts or pole having a cross-bar, a band-spring carried by said cross-bar, a singletree encircled by said band-spring, a pin passing through said band-spring and singletree and held in position by a trigger, and an angle-iron carried by said cross-bar, said trigger carried by said angle-iron, a spring controlling said trigger, a releasing-strap attached to said pin, tug-fastenings carried by said singletree and adapted to release the tugs when the singletree is rocked, substantially as described.

In testimony that I claim the foregoing as my own I affix my signature in presence of two witnesses.

GEORGE GREBE.

Witnesses:
 ADAM G. HEILIGER,
 FRED ZABEL.